United States Patent [19]

Cosgrove, deceased et al.

[11] 4,399,507

[45] Aug. 16, 1983

[54] INSTRUCTION ADDRESS STACK IN THE DATA MEMORY OF AN INSTRUCTION-PIPELINED PROCESSOR

[75] Inventors: Michael R. Cosgrove, deceased, late of Haymarket, Va., by Dorothy M. Cosgrove, administratrix; Alexander H. Frey, Jr., Cabin John, Md.; Kenneth A. Moore, Manassas, Va.; Abraham Peled, San Jose, Calif.; Frederic N. Ris, Mohegan Lake, N.Y.; William W. Sproul, III, Reston, Va.

[73] Assignee: IBM Corporation, Armonk, N.Y.

[21] Appl. No.: 280,417

[22] Filed: Jun. 30, 1981

[51] Int. Cl.³ .............................................. G06F 9/28
[52] U.S. Cl. ................................................. 364/200
[58] Field of Search ............................. 364/200, 900

[56] References Cited

U.S. PATENT DOCUMENTS

| | | | |
|---|---|---|---|
| 3,231,863 | 1/1966 | Ulfsparre | 364/200 |
| 3,740,728 | 6/1973 | Pullen | 364/200 |
| 3,840,861 | 10/1974 | Amdahl et al. | 364/200 |
| 3,875,391 | 4/1975 | Shapiro et al. | 364/200 |
| 3,900,834 | 8/1975 | Casey et al. | 364/200 |
| 3,935,563 | 1/1976 | Unger | 364/200 |
| 3,984,817 | 10/1976 | Barbour et al. | 364/200 |
| 4,016,543 | 4/1977 | Franks et al. | 364/200 |
| 4,025,771 | 5/1977 | Lynch, Jr. | 364/200 |
| 4,041,462 | 8/1977 | Davis et al. | 364/200 |
| 4,047,162 | 9/1977 | Dorey et al. | 364/200 |
| 4,068,304 | 1/1978 | Beausoleil et al. | 364/200 |
| 4,109,311 | 8/1978 | Blum et al. | 364/200 |
| 4,112,489 | 9/1978 | Wood | 364/200 |
| 4,187,539 | 2/1980 | Eaton | 364/200 |

OTHER PUBLICATIONS

Ruiz, "An Architecture for Digital Signal Processing," Paper given at the Microdelcon 80 IEEE Computer Society on Mar. 11, 1980.
Braudaway, "Future Signal Processing", IBM Technical Directions, Summer 1980, pp. 25-30.

*Primary Examiner*—James D. Thomas
*Assistant Examiner*—David Y. Eng
*Attorney, Agent, or Firm*—John E. Hoel

[57] ABSTRACT

An instruction pipeline for a data processor is disclosed, in which instruction execution is carried out in a sequence of phases which include fetching the instruction from an instruction storage, computing a data storage address from the fetched instruction, accessing the data storage at the computed address to obtain a datum operand, and then carrying out the logical or arithmetic operation on the accessed datum in accordance with the fetched instruction. Branch and stack instructions and return instructions are accommodated by providing a return address stack in the data storage, which stores the next instruction store address to be returned to after a return operation has been completed. Since the instruction address stack in the data storage cannot be directly accessed by the instruction fetching stage of the pipeline until several instruction execution phases have transpired, without degrading the performance of the pipeline, a stack register is provided in the instruction fetch stage of the pipeline which contains a duplicate of the instruction store address presently residing at the top of the instruction address stack. Then when a return instruction is encountered in the instruction fetch stage, the address of the next instruction to be returned to in the instruction storage is immediately available without interrupting the flow in the pipeline. A stack pointer in a stage of the pipeline between the instruction fetch stage and the data store access stage, then takes advantage of unused instruction phases in the pipeline, to cause the data store access stage to read the next available instruction store address from the instruction address stack therein and load it into the stack register in preparation for the next return instruction. Thus, the data storage and instruction stacking function can be shared in the same data storage device which is accessed by an intermediate stage in the multiple phase instruction pipeline without degrading the performance of the pipeline.

26 Claims, 5 Drawing Figures

RSP FUNCTIONAL BLOCK DIAGRAM

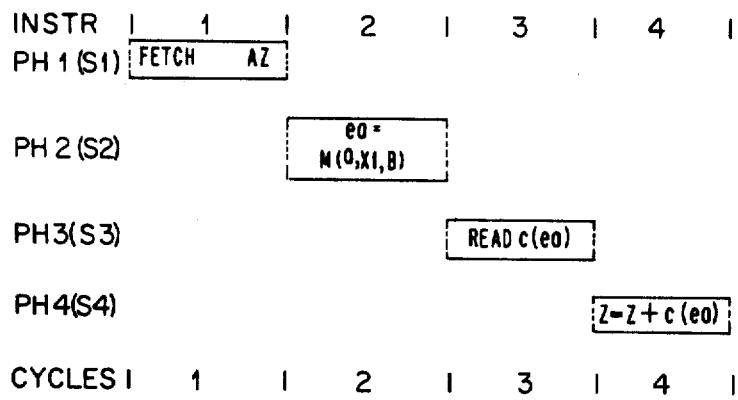
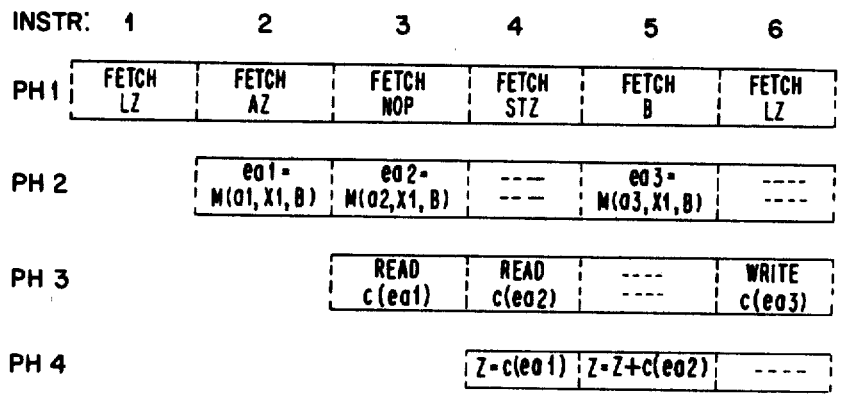
FIG. 2
INSTRUCTION PIPELINE OPERATION

INSTRUCTION SEQUENCING AND FETCH STAGE 1

DATA STORE STAGE 3

INSTRUCTION ADDRESS STACK IN THE DATA MEMORY OF AN INSTRUCTION-PIPELINED PROCESSOR

FIELD OF THE INVENTION

The invention disclosed broadly relates to data processing systems and more particularly relates to the instruction mechanism in stored program data processors.

BACKGROUND OF THE INVENTION

A computer instruction is the specification of an operation to be performed, and may include the address of one or more operands on which the operation will be performed, the address for the location of the results, and an address of the next instruction in the sequence. These specifications or addresses may be implicitly defined, that is the machine will assume, in the case of the specification of the next instruction location, that the instructions lie in sequence. That is, the next instruction is contained in the address following the location of the current instruction. The location of the current instruction is kept in a register called the sequential address register (SAR). During the execution of an instruction the SAR is advanced by one address unit.

In all systems that use SAR's, there must be an additional mechanism for initializing the value and for changing values at certain points in the program in order to execute subroutines, for example. This mechanism is a special instruction, called "branch." There are two basic kinds of branch instructions: a branch without stacking and a branch with stacking. Both types of branch cause a new value to be substituted for the next sequential address in the SAR and hence define the start of the location of a new sequence of instructions. A branch with stacking instruction causes the storage in a LIFO stack memory of the next sequential instruction address, before the original instruction sequence is altered, and can be used to execute a subroutine, for example. This enables the system to return to the original sequence at the stored address. For definitional purposes, the term "branch" as used herein will mean the branch with stacking operation.

After the completion of the subroutine operations following a branch instruction, the program should return to the point in the original instruction sequence which was the point of departure for the branch. This is accomplished by a "return instruction." The instruction address to which the program is to return must be stored at the time the branch instruction was executed. In order to accommodate several consecutive branch instructions, the last in-first out (LIFO) instruction address stack must be provided to store those return addresses.

The conventional way to provide an instruction address stack for a pipelined instruction architecture is to put a large, dedicated register file in the first stage of the instruction pipeline because this is the stage that determines the order of execution. However, with the advent of large-scale integrated circuitry, substantial reductions in unit cost can be achieved by condensing the instruction processing and arithmetic circuitry for the processor onto a single integrated circuit chip. However, the large storage functions of data storage and instruction storage must be carried out by separate memory chips since the available area on the processor chip is limited. Although it is desirable to maintain a record of return addresses for instruction branching which is immediately accessible by the first stage of the instruction pipeline, the inclusion of such a large storage function on the same integrated circuit chip containing the instruction and arithmetic processing elements, is not feasible. However, the placement of the return address storage function in the data storage could not be achieved in the prior art, even if the data storage were on the same integrated circuit chip, because a return address could not be accessed from the data store until several machine cycles or phases after the return instruction was read by the first stage.

The placement of last in-first out (LIFO) stacks in the data store of a data processing system is not new. For example, U.S. Pat. No. 4,041,462 to Davis, et al., assigned to the instant assignee, describes carrying out subroutine linkage by using an LIFO stack in the data storage. However Davis, et al, were not confronted with the concurrent pipelined instruction execution which is the problem to be solved for a sequential phase instruction pipeline. Davis, et al, have their instructions invoke the accessing of the stack in the data store. This would, of necessity, degrade the throughput of the instructions in an instruction pipeline.

OBJECTS OF THE INVENTION

It is therefore an object of the invention to provide an improved sequencing instruction mechanism for an instruction execution pipeline in a data processor.

It is another object of the invention to provide an improved pipelined instruction mechanism for a data processor completely contained on an integrated circuit chip, having a reduced power dissipation.

It is still another object of the invention to make use of unused instruction phases to carry out branch or return operations in an instruction pipelined mechanism for data processor.

It is still a further object of the invention to provide a processor which can access return addresses in an instruction stack located in a data storage which is normally accessed in machine cycles subsequent to the instruction fetch machine cycle, in an improved manner.

It is yet a further object to share the data storage function and the instruction stacking function in the same data storage device accessed by a multiple phase instruction pipeline, without degrading the performance of that pipeline.

SUMMARY OF THE INVENTION

These and other objects, features and advantages of the invention are accomplished by the invention disclosed herein. An instruction pipeline for a data processor is disclosed, in which instruction execution is carried out in a sequence of phases which include fetching the instruction from an instruction storage, computing a data storage address from the fetched instruction, accessing the data storage at the computed address to obtain a datum operand, and then carrying out the logical or arithmetic operation on the accessed datum in accordance with the fetched instruction. Branch and return instruction are accommodated by providing a return address stack in the data storage, which stores the next instruction store address to be returned to after a branching operation has been completed. Since the instruction address stack in the data storage cannot be directly accessed by the instruction fetching stage of the pipeline until several instruction execution phases have transpired, without degrading the performance of the pipeline, a stack register is provided in the instruction fetch stage of the pipeline which contains a duplicate of the instruction store address presently residing at the top of the instruction address stack. Then when a return instruction is encountered in the instruction fetch stage, the address of the next instruction to be returned to in the instruction storage is immediately available without interrupting the flow in the pipeline. A stack pointer in a stage of the pipeline between the instruction fetch stage and the data store access stage, then takes advantage of unused instruction phases in the pipeline, to cause the data store access stage to read the next available instruction store address from the instruction address stack therein and load it into the stack register in preparation for the next return instruction. Thus, the data storage and instruction stacking function can be shared in the same data storage device which is accessed by an intermediate stage in the multiple phase instruction pipeline without degrading the performance of the pipeline. An additional advantage accrues in that the partitioned size of the address stack in the data store can be decremented and the saved space can be used for data storage.

DESCRIPTION OF THE FIGURES

These and other objects, features and advantages of the invention will be more fully appreciated with reference to the accompanying figures.

FIG. 2 is an illustration of the instruction pipeline operation.

DISCUSSION OF THE PREFERRED EMBODIMENT

An instruction pipeline for a data processor is disclosed, in which instruction execution is carried out in a sequence of phases which include fetching the instruction from an instruction storage, computing a data storage address from the fetched instruction, accessing the data storage at the computed address to obtain a datum operand, and then carrying out the logical or arithmetic operation on the accessed datum in accordance with the fetched instruction. Branch and return instructions are accommodated by providing a return address stack in the data storage, which stores the next instruction store address to be returned to after a branching operation has been completed. Since the instruction address stack in the data storage cannot be directly accessed by the instruction fetching stage of the pipeline until several instruction execution phases have transpired, without degrading the performance of the pipeline, a stack register is provided in the instruction fetch stage of the pipeline which contains a duplicate of the instruction store address presently residing at the top of the instruction address stack. Then when a return instruction is encountered in the instruction fetch stage, the address of the next instruction to be returned to in the instruction storage is immediately available without interrupting the flow in the pipeline. A stack pointer in a stage of the pipeline between the instruction fetch stage and the data store access stage, then takes advantage of unused instruction phases in the pipeline, to cause the data store access stage to read the next available instruction store address from the instruction address stack therein and load it into the stack register in preparation for the next return instruction. Thus, the data storage and instruction stacking function can be shared in the same data storage device which is accessed by an intermediate stage in the multiple phase instruction pipeline without degrading the performance of the pipeline.

Figure 1:
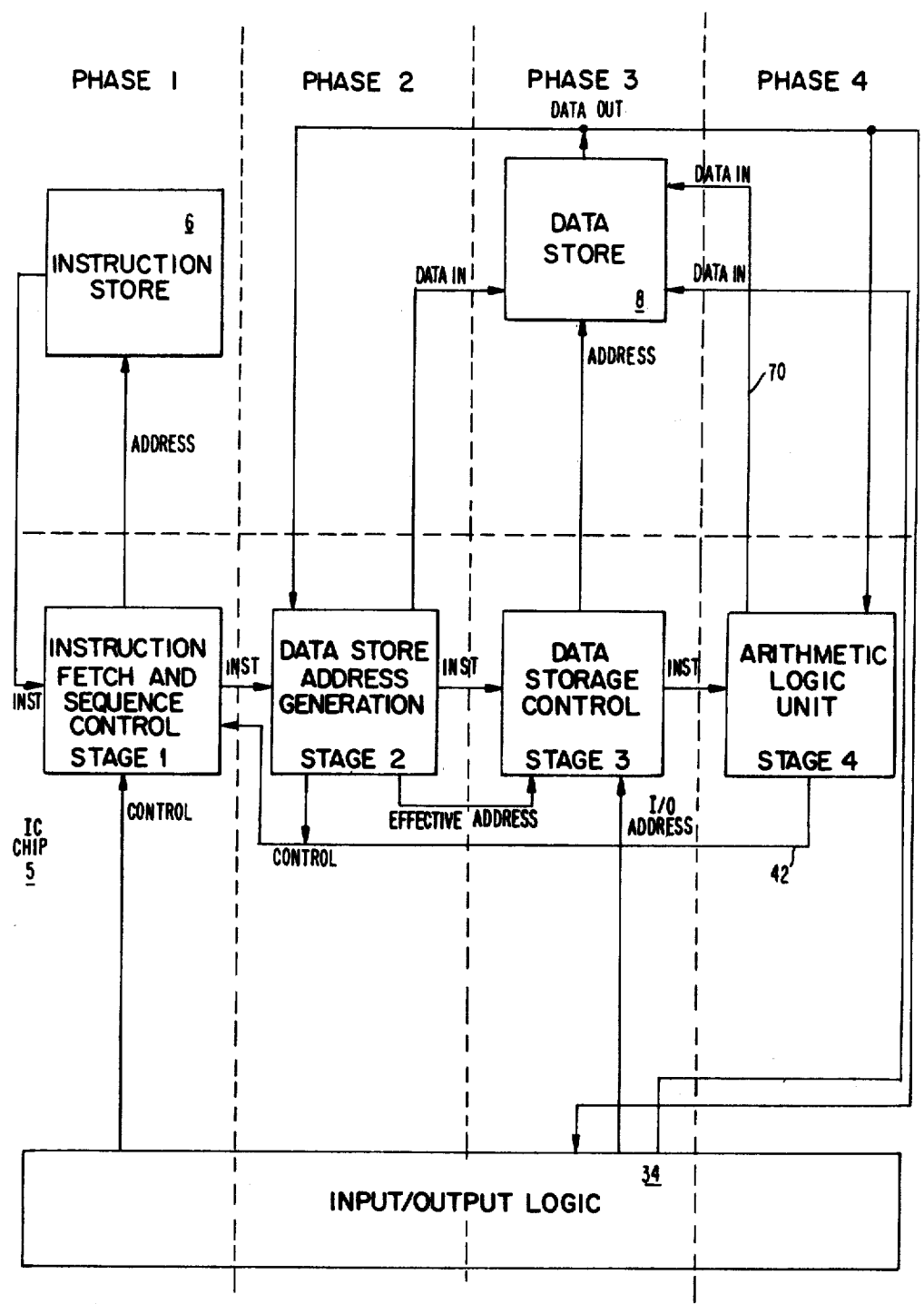
FIG. 1 is a functional block diagram of the real time signal processor.

The real time signal processor (RSP) is a single operand general purpose processor with a 16-bit data flow and a 24-bit instruction set which is particularly adapted to implement signal processing algorithms. The RSP has a pipelined instruction organization designed to achieve maximum processing throughput without requiring high performance, high power circuits. The architecture contains a full repertoire of arithmetic, logic, and control instructions including a variable precision multiply and a 32-bit divide. The entire processor, exclusive of the memory, is designed to be implemented on a single VLSI chip 5 as shown in FIG. 1.

Figure 3:
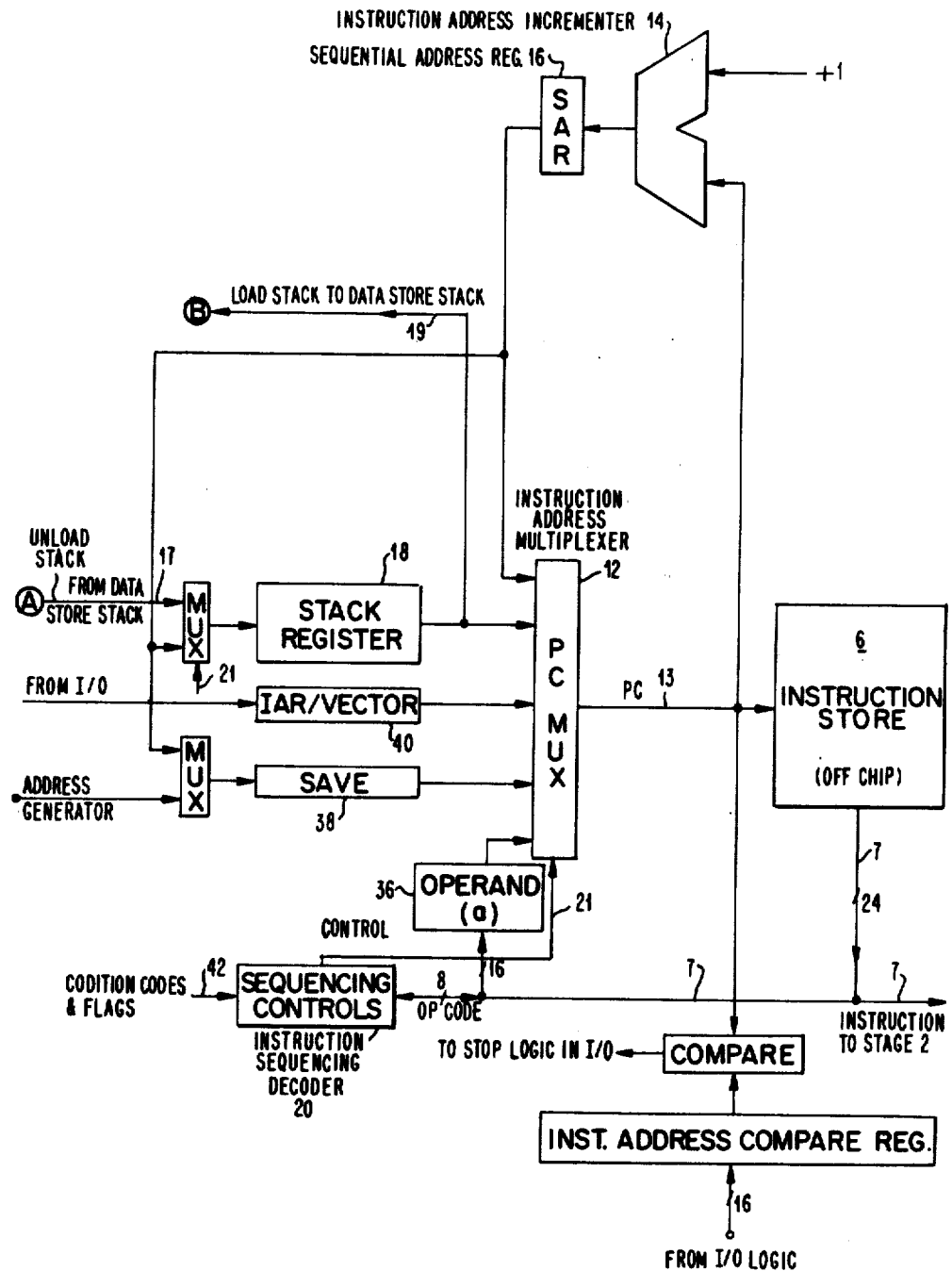
FIG. 3 is a functional block diagram of the instruction sequencing and fetch stage 1.

The RSP instruction set is built around instructions which perform arithmetic functions in one cycle (except multiply, divide, and left shift) where one of the operands can be contained in data store 8 and the other in a local register 18 as is shown in FIG. 3. The result is returned to a local register. The four distinct functions to be performed in order to execute such an instruction are:

(1) Fetch instruction
(2) Form effective address for data store operations
(3) Perform data store access
(4) Perform arithmetic operations and load result For any one such instruction, these four functions must be performed sequentially. The pipelined instruction concept takes advantage of this characteristic of the instructions. The architecture of the RSP assigns a distinct area of hardware to each function. As the stage which performs one of the four functions acts upon one instruction, another stage may be used to act upon another instruction simultaneously. The performance of an operation on an instruction is referred to as the execution or a phase of that instruction. Phase 1 of an instruction is the instruction fetch. Phase 2 is the effective address generation. Phase 3 is the data memory access, and Phase 4 is the arithmetic function execution. The distinct area of hardware which implements a function is referred to as a stage. The hardware stages execute the four phases for four different instructions concurrently.

Since the RSP was designed to be built on a single LSI chip 5, space on the chip is at a premium. The large storage functions of data storage 8 and instruction storage 6 are therefore carried out by separate memory chips which are accessed by the RSP chip 5.

In order to maintain a record of return addresses for instruction branching, a 64 address capacity LIFO storage is required which must be immediately accessible by the first stage of the instruction pipeline. But the inclusion of such a large storage function on the RSP chip 5 would have consumed excessive chip area and dissipated excessive power. Alternately, the placement of the return address LIFO storage function in the data store 8 appeared to be unsuitable because a return address could not be accessed from the data store until two phases after the return instruction was read by the first stage, without degrading pipeline throughput.

This problem is solved by the present invention as follows.

Figure 5:
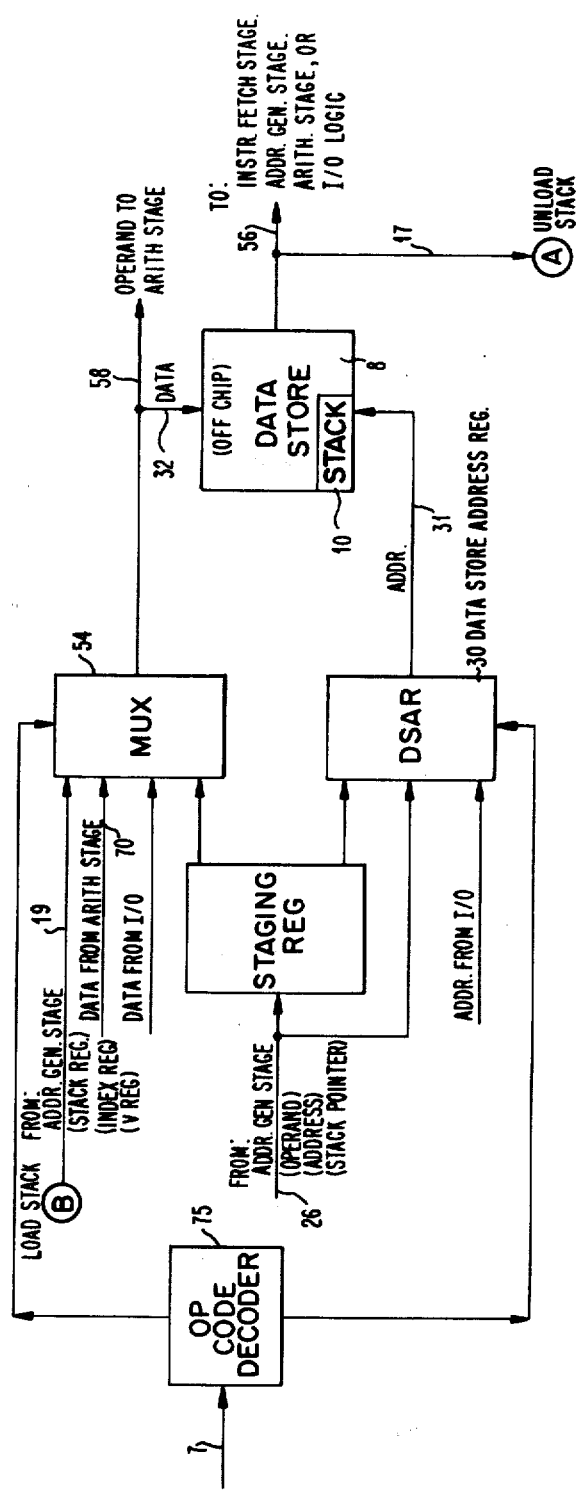
FIG. 5 is a functional block diagram of the data store stage 3.

The address sequencing control includes a 64 level stack 10 shown in FIG. 5, located in data store 8 (memory locations 0 to 63). The value written into the 'top' of the stack 10, is also held in a single 16-bit hardware stack register 18 located in the instruction sequencing and fetch stage 1. This 64 level stack 10 which is addressed with a 6-bit stack pointer (SP) 28 allows nesting up to 64 levels of subroutine and interrupt routines. The instructions which affect the stack are: branch and stack unconditionally 'BS,' return 'RET,' and return and enable interrupts 'RET ENABLE.' Unmasked interrupts also affect the stack.

Figure 4:
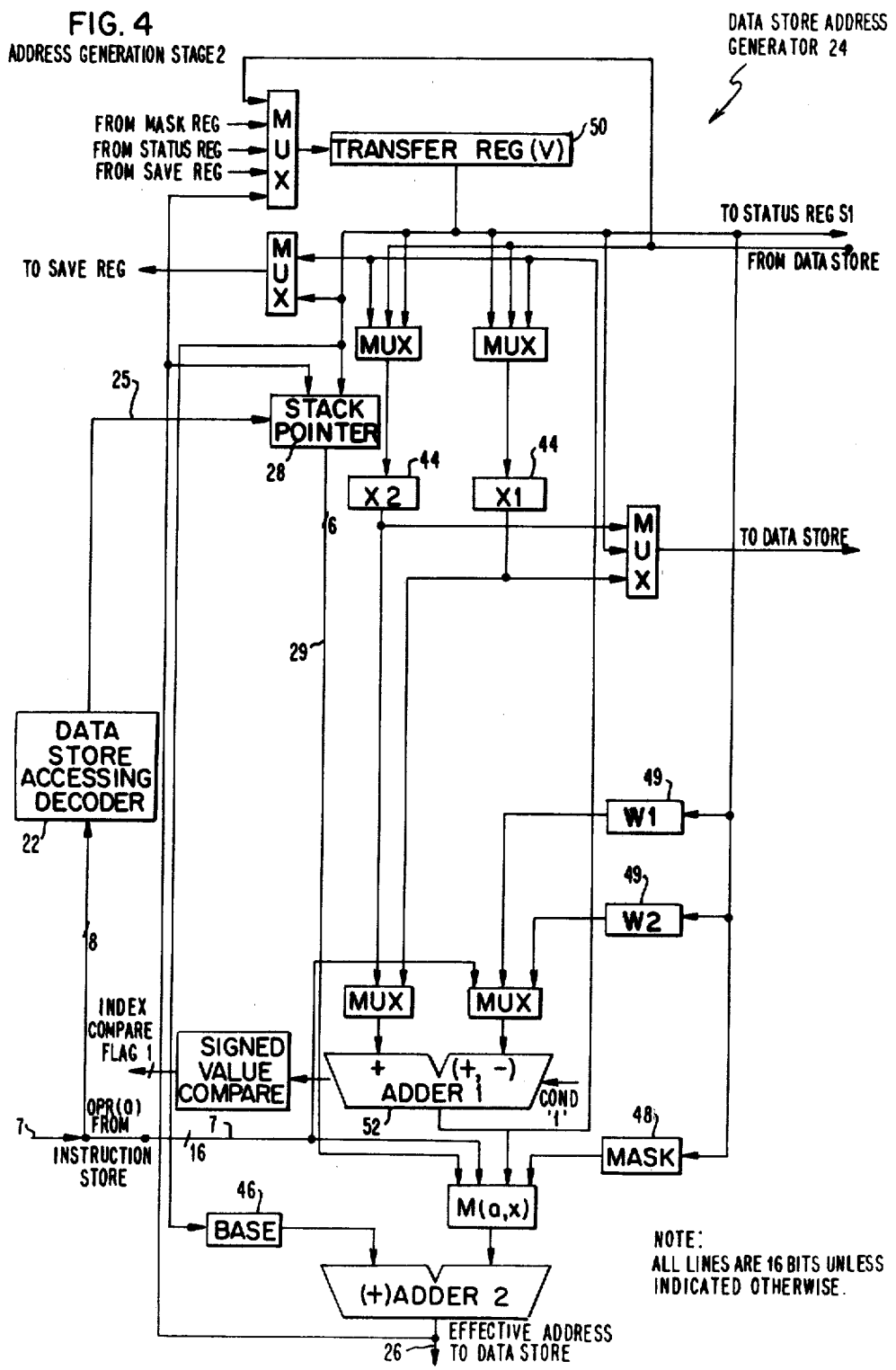
FIG. 4 is a functional block diagram of the address generation stage 2.

The branch and stack 'BS' instruction causes the next sequential address (the value of the Sequential Address Register (SAR) 16) to be written into the stack register 18 at the end of Phase 2, and then implements an unconditional branch to the instruction address specified by the operand 'a' of the instruction. It also increments the stack pointer (SP) 28 as shown in FIG. 4, by one (i.e. SP$\leftarrow$SP+1) by the end of Phase 2 and then during Phase 3, it writes the value of the SAR 16 into the data store stack 10 at the address pointed to by the SP 28. Thus the updated stack pointer register 28 always contains the address of the 'top' of the data store stack 10.

The 'RET' type instructions cause the contents of the address pointed to by the stack pointer 28 (i.e., 'top' of stack) to be used as the address of the next instruction. Since this value is held in the stack register 18, it is available for use in the next cycle. In Phase 2, the stack pointer 28 is decremented by 1 (i.e. SP$\leftarrow$SP—1) to point to the next value in the stack 10, and then in Phase 3 of the instruction, that value is read from the data store stack 10, and loaded into the stack register 18 at the end of Phase 3 of the 'RET' type instruction. This allows the return address just read from the data store stack 10 to be available for use by a subsequent 'RET' type instruction occurring at least one instruction away from any previous 'RET' type instruction. This is because the first 'RET' type instruction which reads the data store stack 10 and loads the valve into the stack register 18 during its Phase 3, will have had time to complete this stack register update.

Thus the RSP chip 5 has a 64 address stack 10 immediately available to its instruction fetch stage 1 without occupying excessive chip area on the LSI device. This is achieved by employing the otherwise unused second and third stages 2 and 3 of the RSP instruction pipeline during branch and return operations to access the stack 10 which is actually located in a partitioned area of the data store 8.

As is shown in FIG. 1, a stored program data processor is formed on an integrated circuit chip 5, having a pipelined instruction mechanism including four time-sequential stages with a first stage 1 for instruction sequencing and fetch, a second stage 2 for data store address generation, a third stage 3 for data store access, and a fourth stage 4 for arithmetic execution. These stages operate in an overlapped mode on successive instructions each including an op code and an operand, which are accessed from an instruction store 6 external to the chip 5, to carry out arithmetic operations on data accessed from a data store 8 external to the chip 5.

The improved instruction branching mechanism is shown in more detail in FIGS. 3, 4, 5 and 6. A last-in-first-out instruction address stack 10 of FIG. 5 is in a partitioned area of data store 8, for storing addresses for the instruction store 6. An instruction address multiplexer 12 of FIG. 3 is in the first stage 1 and has an output 13 connected to an address input of the instruction store 6 and having a plurality of inputs, for inputting instruction addresses to the instruction store 6. An instruction address incrementer 14 of FIG. 3 is in the first stage 1 and has an input connected to the output 13 of the multiplexer 12 and an output connected through a sequential address register (SAR) 16 to one of the inputs of the multiplexer 12, for sequentially incrementing the instruction store addresses by unity.

A stack register 18 of FIG. 3 is in the first stage 1 and has an input selectively connected to either an output of the sequential address register 16 or to an output 17 from the instruction address stack 10 in the data store 8, for storing the last instruction store address outputted from the incrementer 14 or storing the last instruction store address outputted over line 17 from the instruction address stack 10 in the data store 8 and has an output selectively connected to either an input to the multiplexer 12 or to an input over line 19 to the instruction address stack 10 in the data store 8. Stack register 18 stores only a single address.

An instruction sequencing decoder (sequencing controls) 20 of FIG. 3 is in the first stage 1 and has an input connected to an output 7 of the instruction store 6 and an output 21 connected to the multiplexer 12, for selectively controlling the connection of the instruction store 6 address input 13, through the multiplexer 12, to either the sequential address register 16 output or to the stack register 18 output in response to the op code of the last instruction word accessed from the instruction store 6 over line 7.

The multiplexer 12 can have one of its plurality of inputs connected to the output 7 of the instruction store 8 for selectively transferring the operand of the last instruction accessed therefrom as an unconditional branch address input to the instruction store 6 in response to the decoding of the associated op code in the instruction sequencing decoder 20.

A data store accessing decoder 22 of FIG. 4 is in the second stage 2 and has an input 7 connected to the instruction store 6 output, for decoding the op code from the last instruction accessed from the instruction store 6. A data store address generator 24 of FIG. 4 is in the second stage 2 and has an input 7 connected to the instruction store 6 output, a control input 25 connected to the data store accessing decoder 22, and an output 26, for selectively generating a data store 8 address from the operand of the last accessed instruction word in response to the decoding of the associated op code in the data store accessing decoder 22. A stack pointer 28 of FIG. 4 is in the second stage 2 and has a control input 25 connected to the data store accessing decoder 22 and an output 29, for selectively incrementing or decrementing a data store address value for accessing the last instruction address stored in the instruction address stack 10 in the data store 8.

A data store address register 30 of FIG. 5 is in the third stage 3, and has an input connected to the data store address generator 24 output 26 and to the stack pointer 28 output 29, and an output 31 connected to the address input of the data store 8, for accessing a location in the data store 8.

In a branch operation, the instruction sequencing decoder 20 selectively controls the transfer of the operand of an unconditional branch instruction through the multiplexer 12 to the address input 13 of the instruction store 6 in response to the associated branch op code, selectively controls the incrementing of the sequential address register 16 by unity and loads the contents thereof into the stack register 18 in response to the associated branch op code, and selectively controls the nondestructive outputting of the contents of the stack register 18 over line 19 to the data input 32 of the data store 8 in response to the associated branch op code. The data store accessing decoder 22, in response to the branch op code, selectively controls the incrementing of the stack pointer 28 by unity and the outputting of its contents to the data store address register 30 as the address of the location in the instruction address stack 10 for storing the contents of the stack register 18 as the return address from the branch specified in the branch op code.

During the above branch operation, the instruction sequencing decoder 20 in the first stage 1, carries out its controlling operations during a first phase or interval upon the occurrence of the branch instruction. The data store accessing decoder 22 in the second stage 2, carries out its controlling operations during a second phase following the first phase. And the data store address register 30 in the third stage 3 accesses the data store 8 at the location in the instruction address stack 10 and the data store 8 stores the contents of the stack register 18 there, during a third phase following the second phase. In this manner, the otherwise unused second and third stages 2 and 3 are employed during a branching operation to access the instruction stack 10 which is not located on the integrated circuit chip 5.

In a return operation, from a previous branch operation, the instruction sequencing decoder 20 in the first stage 1, during a first phase, selectively controls the transfer of the contents of the stack register 18 through the multiplexer 12 to the address input 13 of said instruction store 6 in response to a return instruction. The data store accessing decoder 22, in the second stage 2, during a second phase following the first phase and in response to the op code of the return instruction, selectively controls the decrementing of the stack pointer 28 by unity and the outputting of its contents to the data store address register 30 in the third stage 3 for accessing the last instruction address stored in the instruction address stack 10 in the data store 8. The instruction sequencing decoder 20, in the first stage 1, during a third phase following the second phase, selectively controls the loading over line 17 into the stack register 18 of the last instruction address accessed from the instruction address stack 10 in the data store 8. In this manner, the return address can be used to access the instruction store 6 when a return instruction occurs at least one cycle from the previous return instruction, even though the instruction address stack 10 cannot be accessed in the data store 8 until the third interval.

The following is a more detailed description of certain elements of the Real Time Signal Processor.

Instruction Sequencing & Fetch Stage—Phase 1

This stage 1 shown in FIG. 3 implements only Phase 1 of the instruction execution. In this stage, the 8-bit op code of the previous instruction is decoded, the address of the current instruction is determined based on the Condition Codes in the processor and the decode of the previous instruction op code, and the current instruction is fetched from Instruction Store 6.

The value of the Program Counter (i.e. the current instruction address) is selected from either the next sequential address 16 or one of a number of possible branch addresses. The address selection is under program and/or interrupt control. In all cases, the address of the current instruction is entirely resolved during Phase 1 of an instruction execution in order that branching can occur in one instruction cycle.

Address Generation Stage—Phase 2

In the second Phase of the instruction execution, the effective Data Store address is calculated for those instructions which require data memory 8 access. The 16-bit operand field 'a' of the instruction is passed to the Address Generation Stage 2 shown in FIG. 4. The effective address for the Data Store operation is then formed as one of four functions depending on the instruction. The four types of effective address are:

| (1) | a | | Direct Memory |
|---|---|---|---|
| (2) | a + B | | Offset Memory |
| (3) | a + Xi | i = 1,2 | Indexed Memory |
| (4) | M(a,Xi,B) | i = 1,2 | Masked Memory | where
B is the Base Register
M is the Mask Register
Xi is an Index Register (i=1,2), and
M(a,Xi,B) is the Mask function which is
used for circular buffer operations.

In order to provide efficient control over various signal processing data structures, a number of instructions are provided for updating the registers that are used in the formation of the effective address (i.e. X1, X2, W1, and W2). These instructions complete execution in the Second Phase unless they involve Data Store operations. Data Store writes are completed in the third phase. Operations which read Data Store 8 perform the read operation and Stage 2 register update in Phase 3 so that the updated registers are available in the following phase (cycle). For Data Store operations, the effective addresses are generated by the Stage 2 logic and passed to the Data Store Address Register (DSAR) 30 at the end of Phase 2, in preparation for access in Phase 3.

Data Storage Stage—Phase 3

During Phase 3 of an instruction execution (the memory access phase), the Data Store 8 is accessed at the effective address. The Address Generation Stage hardware 2 passes the effective address, calculated in the previous cycle (phase), to the Data Store Stage 3 of FIG. 5 for use in the present phase. For Read operations, the Data Store output is loaded into the appropriate register specified by the op code of the previous instruction. This is done at the completion of Phase 3 of that instruction in preparation for use during Phase 4. Some instructions do not access Data Store 8 for an operand but require the immediate operand to participate in the arithmetic of Phase 4. In this case the Data Storage Stage forms a conduit for passage of the instruction operand 'a' from the Stage 2 hardware to the Stage 4 hardware for use during Phase 4 of the instruction.

In order to maintain coherent execution of instructions, the execution of all four phases must remain fixed relative to one another. For this reason, when an external device requires access to the Data Store 8 it must do so through the I/O stage 24, and the entire pipeline must be stopped. This process is referred to as a Cycle Steal Operation. Any I/O access of Data Store 8 will result in a Cycle Steal operation which will delay the pipeline execution for one machine cycle. All four phases/stages are delayed.

Arithmetic Stage—Phase 4

In the fourth and final phase of an instruction execution, the Arithmetic Stage 4 executes the actual arithmetic operation defined in the instruction. Most instructions in the set of arithmetic operations, execute in a single cycle of the Arithmetic Stage 4. However, the multiply, divide, and arithmetic left shift, instructions require multiple executions of this stage in order to complete. The multiply instruction requires up to 8 cycles, the divide requires 17 cycles, and the left shift instruction requires 1 more cycle (in Phase 4) than the shift count (0 to 31). In these cases, the first three stages/phases 1, 2, and 3 of the instruction execution are "frozen" while Stage 4 for the present instruction is allowed to execute until the instruction is completed.

Input/Output Stage

The functions of the I/O stage 34 can be divided into 2 major areas: Direct I/O, and Externally Controlled I/O. The following is a brief description of each function.
(1) Direct I/O—This allows the processor to input or output a single word to an External device under Program Control.
(2) Externally Controlled I/O—This allows an External Device the capability to directly read out of or write into an RSP under control of the External Device.

Other RSP Features

Other features provided in the RSP include a Real Time Clock, a Maintenance Interface with the capability to allow a Scan In/Scan Out of all registers and latches in the RSP, and an I/O Interface with the capability to allow an External Device to control the RSP by issuing a set of Function Commands.

Pipeline Operation Examples

Two examples of the instruction pipeline are shown in FIG. 2. Example 1 shows a single instruction being executed. Phases 1 through 4 refer to the four functions performed on the instruction by the four hardware stages. The cycles refer to machine cycles. This example illustrates the instruction 'AZ Z,a(M1)' which adds the contents of the Masked Memory location M(a,X1,B) to the contents of the Z register and places the sum into the Z Register. The instruction operand 'a' is modified by the register set X1, B, and M to form the masked effective address (ea)=M(a,X1,B) in Stage 2 and the storage location is accessed in Stage 3. The sum is formed and loaded into the destination register in Stage 4.

Example 2 shows a set of instructions which perform the following sequence of operations:
(1) 'LZ a1(M1)' Load the contents of Masked Memory location M(a1,X1,B) into the Z Register.
(2) 'AZ Z,a2(M1)' Add the contents of Masked Memory location M(a2,X1,B) to the Z Register, and place the result into the Z Register.
(3) 'STZ a3(M1)' Store the contents of the Z Register in Masked Memory location M(a3,X1,B).
(4) 'B a4' Branch to instruction address (a4).

A no-operation instruction 'NOP' is inserted in the instruction pipeline in order to allow time for the fourth stage 4 of the pipeline to complete for the 'AZ' instruction before the third stage of the 'STZ' instruction performs the storage operation to move the result. The unused cycles retain their position in the instruction pipeline.

DETAILED DESCRIPTION OF OPERATION

This section describes in detail the operation of the hardware stages of the RSP. It includes the details of (1) How the instructions are fetched and decoded, (2) How the effective address is generated and used, and (3) How the various Condition Codes and registers (SAR, STACK, etc.) are set and interpreted.

INSTRUCTION SEQUENCING AND FETCH STAGE - STAGE 1

This stage is depicted in the flow diagram of FIG. 3. It implements the Phase 1 function of execution of the instruction pipeline. This Stage contains the Instruction Address Selection Logic which controls the Instruction Store 6.

Instruction Store

The Instruction Store 6 which is 24 bits wide, is made up of an 8-bit op code field and a 16-bit operand field. It is addressed by the Program Counter (PC) multiplexer 12. The PC Mux output 13 which is 16 bits, is capable of addressing an Instruction Store 6 of up to 65536 instructions.

Instruction Address Selection Logic

During Phase 1 of an instruction execution, the Instruction Address Selection Logic decodes the 8-bit op code from the previous instruction to determine the source for the address of the present instruction. The address is selected by the PC Mux 12 and the instruction is accessed. Op codes from the previous instruction which call out Branch, Proceed, or Return, operations cause the address of the instruction being fetched to be taken from one of five branch sources. All other op codes cause the current instruction address to be taken from the Sequential Address Register (SAR) 16 which contains the address of the last instruction fetched (PC) plus one.

The instruction address generation and fetch operations are performed in the same cycle to ensure that branching takes place in one cycle. The PC Mux 12 selects the current instruction address from among the following sources all of which are 16-bit registers.
(1) SAR 18—Next sequential address (PC+1)
(2) STACK 10—Top of the 64 word instruction address STACK
(3) a 36—The operand field of the instruction
(4) SAVE 38—Contents of Save Register
(5) IAR/Vector 40—Vectored Interrupt address The Sequential Address Register (SAR) 16 is selected as the source for sequentially addressing Instruction Store 6. The STACK Register 18 is selected as the source for the return 'RET' type instructions. The Operand Field 'a' 36 of the current instruction is selected as the source for the unconditional branch instructions. It is also used for all conditional branch instructions if the conditional criterion is satisfied. Otherwise the SAR 16 is selected. The SAVE Register 38 is used as the source for the address of the next instruction when the proceed 'PRCD' instruction, or those functions which specify a Proceed are used (i.e. Instructions of the form '—P—'). The IAR/Vector 40 is only used for I/O Interrupt branches to words 1 to 63 of Instruction Store which themselves contain a Branch to the address of the appropriate Interrupt handling routine.

Conditional Branching

Conditional branching decisions are made based on the state of the 8 condition indictors 42. These bits are set as a result of various conditions existing in the processor when the instructions are executed. The condition indicators include the 6 Condition Code bits generated in the Arithmetic Stage 4, and the 2 status flags generated in the other stages. The branch conditions are:

| Condition | Condition Code |
|---|---|
| (1) Arithmetic Result = 0 | ZCC = 1 |
| (2) Arithmetic Result < 0 | NCC = 1 |
| (3) Arithmetic Result Odd | OCC = 1 |
| (4) Internal Overflow | IOF = 1 |
| (5) Pending Internal Overflow | POF = 1 |
| (6) External Overflow | EOF = 1 |
| (7) Index Compare Flag | ICF = 1 |
| (8) Software Flag | SF = 1 |

All arithmetic instructions set Condition Codes 1 thru 5 at the end of Phase 4. For multiply, divide, and arithmetic left shift instructions which require multiple cycles of Phase 4 to complete, the Condition Codes are set after the fourth phase completes. The External Overflow (Condition Code 6) is determined in Phase 3 and set in Phase 4. The Index Compare Flag (7) is generated in the Address Generation Stage and is set in Phase 2 of its instruction execution. The Software Flag is set under program control in Phase 2. Condition Codes 4, 6 and 8 are latched and remain set to 1 until specifically used, at which time they are reset to 0 in Phase 2 of the branch instruction which uses them. All other Condition Code bits are set by each operation which affects them.

The conditional branch instructions are implemented in Phase 1 of the next instruction execution and therefore, are based on the conditions as they exist at that time. Some Branch instructions are based on Condition Codes from the Arithmetic Stage 4. These branches are based on the conditions which are set as a result of arithmetic instructions coded three cycles prior to the Branch or earlier. The Branch on Index Compare Flag (BICF) is based on a condition set as a result of some previous instruction. The Branch on External Overflow instruction is based on a condition set 3 cycles or more prior to the branch instruction.

Stack Operations

The address sequencing control includes a 64 level Stack 10 located in Data Store 8 (memory locations 0 to 63). The value written into the 'Top' of the Stack 10, is also held in a single 16-bit hardware Stack Register 18 located in the Instruction Sequencing & Fetch Stage 1. This 64 level Stack 10 which is addressed with a 6-bit Stack Pointer (SP) 28 allows nesting up to 64 levels of Subroutine and Interrupt routines. The instructions which affect the Stack 10 are: Branch and Stack unconditionally 'BS', Return 'RET', and Return and Enable Interrupts 'RET ENABLE'. Unmasked Interrupts also affect the Stack 10.

The Branch and Stack 'BS' instruction causes the next sequential address (the value of the SAR 16) to be written into the Stack Register 18 at the end of Phase 2, and then implements an unconditional branch to the instruction address specified by the operand 'a' 36 of the instruction. It also increments the Stack Pointer (SP) 28 by one (i.e. SP=SP+1) by the end of Phase 2 and then during Phase 3, it writes the value of the SAR 16 into the Data Store Stack 10 at the address pointed to by the SP 28. Thus the updated Stack Pointer register 28 always contains the address of the 'Top' of the Data Store Stack 10.

The 'RET' type instructions cause the contents of the address pointed to by the Stack Pointer 28 (i.e. 'Top' of Stack) to be used as the address of the next instruction. Since this value is held in the Stack Register 18, it is available for use in the next cycle. In phase 2, the Stack Pointer 28 is decremented by 1 (i.e. SP=SP−1) to point to the next value in the Stack 10, and then in Phase 3 of the instruction, that value is read from the Data Store Stack 10, and loaded into the Stack Register 18 at the end of Phase 3 of the 'RET' type instruction. This allows the return address just read from the Data Store Stack 10 to be available for use by a subsequent 'RET' type instruction occuring at least one instruction away from any previous 'RET' type instruction. This is because the first 'RET' type instruction which 'reads' the Data Store Stack 10 and loads the value into the Stack Register 18 during its Phase 3, will have had time to complete this Stack Register update.

However, if an 'RET' type instruction immediately follows another 'RET' type instruction, the hardware must handle this in a special manner. This is because when the second 'RET' type instruction is decoded and fetched, the decoder 20 says that the address for the instruction after the second 'RET' type is the value in the Stack Register 18. However, the Stack Register 18 is still pointing to the second 'RET' type instruction, thus it will be fetched again. There is no problem with the first fetch of the second 'RET' type instruction, but the second fetch of the second 'RET' type instruction attempts to update the Stack Pointer 28 in its Phase 2 (Phase 3 of the first fetch of the second 'RET' type instruction). If this happened, the Stack Pointer 28 would be pointing to the wrong place. Thus the decoder 20 must insert a NO-OP signal on line 7 in place of the normal return instruction in Phases 2, 3, and 4 of the second fetch of the second 'RET' type instruction so that the decoder 22 will inhibit the Stack Pointer 28 from getting updated a second time and decoder 75 will inhibit the reading of data store 8 a second time. The result of this hardware generated NO-OP operation will be that the first fetch of the second 'RET' type instruction will operate normally, but the second fetch of the second 'RET' type instruction will operate as normal in Phase 1 and behave as a 'NOP' instruction in Phases 2, 3, and 4. A third consecutive 'RET' type instruction will be treated like the first since it follows an effective 'NOP' rather than an 'RET' type instruction. The operation with two or more consecutive return instructions is as follows.

During the first machine cycle, the value stored in the stack register 18 will be $S_i$ and the value stored in the stack pointer 28 will be i. The instruction sequencing decoder 20 in the first stage 1 decodes a previous instruction during the first cycle, and controls the multiplexer 12 to input on line 13, a first address to the instruction store 6, fetching a first instruction from the instruction store 6.

At the start of the second machine cycle, the stack register 18 is storing $S_i$ and the stack pointer 28 is storing i. The instruction sequencing decoder 20 in the first stage 1 decodes the first instruction as a first return instruction during the second cycle following the first cycle, and controls the multiplexer 12 to transfer the contents $S_i$ of the stack register 18 as a second address to the instruction store 6, fetching a second instruction from the instruction store 6. The data store accessing decoder 22 in the second stage 2 decodes the first instruction as the first return instruction during the second cycle and controls the stack pointer 28 to decrement its contents by unity to a value $i-1$ which is output to the data store address register 30 in the third stage 3 as a first data store 8 address for the instruction address stack 10.

At the start of the third machine cycle, the stack register 18 is storing Si and the stack pointer 28 is storing $i-1$. The instruction sequencing decodes 20 in the first stage 1 decodes the second instruction as a second return instruction during the third cycle following the second cycle, and controls the multiplexer 12 to again transfer the contents $S_i$ which still occupies the stack register 18, as the second address to the instruction store 6, again fetching the second instruction from the instruction store 6. The instruction sequencing decoder 20 in the first stage 1 has a No-Op output connected via line 7 to the data store accessing decoder 22 in the second stage 2 and to the op code decoder 75 in the third stage 3, for outputting a No-Op signal on line 7 upon the detection of the second return instruction during the third cycle. The data store accessing decoder 22 in the second stage 2 decodes the second instruction as the second return instruction during the third cycle and controls the stack pointer 28 to decrement its contents by unity to a value $i-2$ which is output to the data store address register 30 in the third stage 3 as a second data store 8 address for the instruction address stack 10. The op code decoder 75 in the third stage 3 decodes the first instruction as the first return instruction during the third cycle and controls the data store 8 to access a first datum from the instruction address stack 10 at the first data store address $i-1$ and output the first datum as the value $S_{i-1}$ to the stack register 18 over line 17 in the first stage 1.

At the start of the fourth machine cycle, the stack register 18 is storing $S_{i-1}$ and the stack pointer 28 is storing $i-2$. The instruction sequencing decoder 20 in the first stage 1 again decodes the second instruction as the second occurrence of the second return instruction during the fourth cycle following the third cycle, and controls the multiplexer 12 to transfer the contents $S_{i-1}$ of the stack register 18 as a third address to the instruction store 6, fetching a third instruction from the instruction store 6. The data accessing decoder 22 in the second stage 2 omits operations on the stack pointer 28 during the fourth cycle, in response to the No-Op signal on line 7. The op code decoder 75 in the third stage 3 decodes the second instruction as the second return instruction during the fourth cycle and controls the data store 8 to access a second datum from the instruction address stack 10 at the second data store address $i-2$ and output the second datum as the value $S_{i-2}$ to the stack register 18 over line 19 in the first stage 1.

At the start of the fifth machine cycle, the stack register 18 is storing $S_{i-2}$ and the stack ponter 28 is storing $i-2$. The instruction sequencing decoder 20 in the first stage 1 decodes the third instruction as a first next instruction during the fifth cycle following the fourth cycle, and controls the multiplexer 12 to input a first next instruction address to the instruction store 6, fetching a fourth instruction from the instruction store 6. The data store accessing decoder 22 in the second stage 2 decodes the third instruction as the first next instruction during the fifth cycle, and controls the data store address generator 24 to output a first next data store address to the data store address register 30 in the third stage 3. The op code decoder 75 in the third stage 3 omits operations on the data store 8 during the fifth cycle, in response to the No-Op signal on line 7.

The contents of the stack register 18 and stackpointer 28 do not change for the sixth machine cycle, in this example. The instruction sequencing decoder 20 in the first stage 1 decides the fourth instruction as a second next instruction during the sixth cycle following the fifth cycle, and controls the multiplexer 12 to input a second next instruction address to the instruction store 6, fetching a fifth instruction from the instruction store 6. The data store accessing decoder 22 in the second stage 2 decodes the fourth instruction as the second next instruction during the sixth cycle, and controls the data store address generator 24 to output a second next data store address to the data store address register 30 in the third stage 3. The op code decoder 75 in the third stage 3 decodes the third instruction or the first next instruction during the sixth cycle and controls the data store 8 to access a third datum at the first next data store address. In this manner, the instruction store accessing operations for two consecutive return instructions are expanded in time.

It should be understood that an equivalent way to generate the No-Op signal discussed above would be in the data store accessing decoder 22 instead of the instruction sequencing decoder 20, as disclosed.

The above operation for two consecutive return instructions will automatically accommodate any number of consecutive returns. If there are 2N consecutive return instructions, they will be carried out in 3N machine cycles with every third cycle having a No-Op automatically generated by the hardware as described above. If these are 2N+1 consecutive return instructions, they will be carried out in 3N+1 machine cycles, N of which are hardware generated No-Ops and 2N+1 of which are return instructions, with N=0 or any positive integer. Finally, the receipt of any unmasked Interrupt affects the STACK 10 by causing the appropriate return address of the interrupted program to be 'pushed' into the STACK Register 18 prior to being written into Data Store 8 using the Stack Pointer 28 incremented by 1 (i.e. SP=SP+1) as the address. The Interrupt causes a branch to the appropriate Interrupt Entry Address in Instruction Store 6.

ADDRESS GENERATION STAGE—STAGE 2

This Stage 2 of FIG. 4 implements the second Phase of the instruction execution. The primary function of the Address Generation Stage 2 is to calculate the Effective Address for Data Store 8 operations which take place in the third phase of the instruction execution. Additional functions which are implemented here are as follows:

(1) Index Register arithmetic.
(2) Index Register testing.
(3) SAVE Register calculations.
(4) Transfer Register/Storage interface.
(5) Stack Pointer Register update.

FIG. 4 shows the functional flow diagram for this stage. All control registers in this stage (except the Stack Pointer 28), are 16 bits in length. The Stack Pointer 28 is 6 bits long. The following table lists these control registers with their associated names.

| | | |
|---|---|---|
| Xi | Index Registers 44 | i = 1,2 |
| B | Base Register 46 | |
| M | Mask Register 48 | |
| Wi | Increment Registers 49 | i = 1,2 |
| V | Transfer Register 50 | |
| SP | Stack Pointer 28 | |

Adder 1 (52) is a 16 bit 2's complement adder with additional logic to develop the greater than and less than or equal to functions. Adder 1 can form the complement of a value on the right input for subtraction. Separate control over the carry into the LSB is provided. This allows the adder to perform 2's complement arithmetic or to insert a 1 bit offset which is used in the compare function to create the "Less than or Equal" function. Adder 2 is also a 16 bit 2's complement adder.

The interfaces to the address generation logic are:
(1) The 16 bit operand field 'a' 36 of the instruction.
(2) The 16 bit output to the SAVE Register 38.
(3) The Effective Address output (16 bits) to the Data Store Stage 3.
(4) The 16 bit input and output busses to the Data Store Stage 3.
(5) The op code for control purposes.
(6) The Index Compare Flag. (Contained in STATUS Register S1).
(7) The Software Flag. (Contained in STATUS Register S1).

Effective Address Generation

The generation of the Effective Data Store Address on line 26 involves the implementation of one of the four forms of the address specification. The four forms were previously described. All Effective Addresses are available at the end of Phase 2 of the instruction execution. They are passed to the Data Store Stage 3 for use in Phase 3.

Index Register Operations

The remainder of the functions shown on FIG. 4 are used to implement the other Address Generation arithmetic functions:

Index Register Arithmetic—This function is performed through the use of Adder 1, the X Registers, the W Registers 49, and the feedback of Adder 1 to the Index (X) Registers. The functions which can be performed are: $Xi=Xi+a$, $Xi=Xi+Wj$, and $Xi=Xi-Wj$, $i=1,2$ & $j=1,2$. These operations are performed during Phase 2 of the instruction execution.

Index Register Testing—An Index Compare Flag (ICF) is generated from the results of Adder 1 and is used by the conditional Branch instruction 'BICF'. The adder compares the selected Index Register with either the operand field 'a' or the selected 'W' Register, by performing a subtract of the immediate value (or the appropriate 'W' Register) from the appropriate Index Register, without affecting the contents of the Index Register. The flag is set to the result of the test specified ($>$, $\geq$, $<$, $\leq$). This test takes place during Phase 2 of the instruction execution, and the compare flag is set at the end of Phase 2. A 'BICF' instruction which branches on the result of this compare, will be effective if coded on the next instruction.

SAVE Register Calculation—The feedback path from Adder 1 to the Index Registers is also made available to the SAVE Register 38. The SAVE Register is loaded at the end of Phase 2. This function is implemented by the ASV instruction.

Index Register/Storage Interface—The index Registers interface to Data Store, either directly or via the 'V' Register. The interface to the 'V' Register allows data to be temporarily held there (or loaded from there) if desired. Reads of Data Store 8 cause the Data Store contents to be latched into the appropriate Index Register at the end of Phase 3. Writes to Data Store occur during Phase 3.

Transfer Register

The Transfer (V) Register 50 is used to form a path between Data Store 8 and all of the control registers for the Address Generation Stage 2. This path is bi-directional, in that, data may be transferred from Data Store to any control register or from the control registers to Data Store through the 'V' Register.

The 'V' Register can also be used as a temporary residence of data between the Data Store 8 and all of the control registers. Data is loaded from the 'V' Register to the destination register during Phase 2 of the instruction. For transfers of these control registers to the 'V' Register, an effective direct path is provided back to the 'V' Register with the transfers occurring in Phase 2.

Reads of Data Store 8 have the contents of Data Store delivered to the register pointed to by the op code of the current instruction, at the end of Phase 3. Writes to Data Store from the 'V' Register occur during Phase 3.

Stage 2 Bypass

Some instructions require the operand 'a' for Phase 4 of their execution. For these instructions, the Address Generation Stage 2 is required to deliver the value 'a' to the Effective Address lines at the end of Phase 2. This value is passed through the Data Store Stage 3 in Phase 3 and delivered to the appropriate register in the Stage 4 logic pointed to by the op code of the instruction. From there it is available in Phase 4 as required.

DATA STORE STAGE—STAGE 3

The Data Store Stage 4 of FIG. 5 is made up of the Data Store 8, the address select multiplexer and Data Store Address Register 30, the input selection multiplexer 54, and the output selection multiplexer. The Data Store Stage 3 performs the Data Store and fetch operations for the RSP. The Data Store 8 uses 16-bit words and is addressable up to 65536 words. A 16-bit address register 30 along with source selection logic is provided for selecting between the Effective Address generated by the Address Generation Stage 2 and the address provided by the I/O. Source selection is carried out by the op code decoder 75 which controls the multiplexer 54 and the data store address register 30 in response to op code inputs on line 7. For Write operations to Data Store 8, the data source selection is made from the output 70 of (1) the Arithmetic Stage 4, (2) the Address Generation Stage 2 (X1, X2, and V Registers), (3) the Stack Register 18 in the Instruction Fetch Stage 1, and (4) the I/O 34. The Data Store 8 output 56 is routed to the appropriate register specified by the op code of the current instruction at the completion of Phase 3, for use throughout Phase 4. Data Store Write operations take place in Phase 3 of the instruction execution using the Effective Address generated in Stage 2. The data that is stored is the data which is available in the Source Register at the end of Phase 2.

Data Fetch operations are performed in Phase 3 of instruction execution and the data is placed in the register pointed to by the op code of the current instruction. For loads of the arithmetic stage 4 from Data Store 8, the data is put in the appropriate register at the end of Phase 3, and then during Phase 4 it is passed through the adder or multiplier (thus setting Condition Codes) and written into the destination register at the end of Phase 4 of the instruction.

Input/Output logic 34 (I/O) usage of Data Store 8 occurs using a Cycle Steal operation. Whenever the I/O requires a Data Store operation, the pipeline is stopped while the cycle for Data Store 8 is used by the I/O. Upon completion of a single Cycle Steal for the I/O operation, the pipeline resumes. All Stages of the pipeline must stop together in order to maintain coherent execution of the instructions. For instructions which require an operand value 'a' in the Arithmetic Stage 4 for Phase 4 operations, such as 'AZ Z,a(I)' (add immediate 'a' to Z and place result in Z), a path is provided from the Data Store Address Register 30 to the appropriate register in Stage 4. This path makes the operand 'a' of the instruction, which was placed onto the Effective Address lines by the Address Generation Stage, available as input data to the Arithmetic Stage 4. This is possible because those operations which require the operand for Phase 4 do not make use of the Data Store 8 access function in their execution.

The resulting instruction pipeline architecture for the real time signal processor chip takes advantage of unused instruction phases during the branch and return operations, to enable the accessing of a 64 address (LIFO) Stack which is located in a partitioned area of the data store. Thus, even though the actual location of the instruction stack is several instruction phases beyond the instruction fetch stage, the contents of the address stack are immediately available with the aid of the stack register in the first instruction stage. Furthermore, excessive chip area and power are not consumed by the address stack on the processor chip, which would otherwise have had to be included on the chip in order to be immediately available to the instruction fetch stage. Still further, the partitioned size of the address stack in the data store can be decreased and the saved area used for additional data storage.

Although a specific embodiment of the invention has been disclosed, it will be understood by those of skill in the art that the foregoing and other changes in form and details may be made therein without departing from the spirit and the scope of the invention.

Having thus described our invention, what we claim as new, and desire to secure by Letters Patent is:

1. In a stored program data processor formed on an integrated circuit chip, having a pipelined instruction mechanism including four time-sequential stages with a first stage for instruction sequencing and fetch, a second stage for data store address generation, a third stage for data store access, and a fourth stage for arithmetic execution, said stages operating in an overlapped mode on successive instructions each including an op code and an operand, which are accessed from an instruction store external to said chip, to carry our arithmetic operations on data accessed from a data store external to said chip, an improved instruction branching mechanism, comprising:

a last-in-first-out instruction address stack in a partitioned area of said data store, for storing addresses for said instruction store;

an instruction address multiplexer in said first stage having an output connected to an address input of said instruction store and having a plurality of inputs, for inputting instruction addresses to said instruction store;

an instruction address incrementer in said first stage having an input connected to said output of said multiplexer and an output connected through a sequential address register to one of said inputs of said multiplexer, for sequentially incrementing said instruction store addresses by unity;

a stack register in said first stage having an input selectively connected to either an output of said sequential address register or to an output from said instruction address stack in said data store, for storing the last instruction store address outputted from said incrementer or storing the last instruction store address outputted from said instruction address stack in said data store and having an output selectively connected to either an input to said multiplexer or to an input to said instruction address stack in said data store;

an instruction sequencing decoder in said first stage having an input connected to an output of said instruction store and an output connected to said multiplexer, for selectively controlling the connection of said instruction store address input, through said multiplexer, to either said sequential address register output or to said stack register output in response to the op code of the last instruction word accessed from said instruction store;

said multiplexer having one of its said plurality of inputs connected to said output of said instruction store for selectively transferring the operand of the last instruction accessed therefrom as a branch address input to said instruction store in response to the decoding of the associated op code in said instruction sequencing decoder;

a data store accessing decoder in said second stage having an input connected to said instruction store output, for decoding the op code from the last instruction accessed from said instruction store;

a data store address generator in said second stage having an input connected to said instruction store output, a control input connected to said data store accessing decoder, and an output, for selectively generating a data store address from the operand of said last accessed instruction word in response to the decoding of the associated op code in said data store accessing decoder;

a stack pointer in said second stage having a control input connected to said data store accessing decoder and an output, for selectively incrementing or decrementing a data store address value for accessing the last instruction address stored in said instruction address stack in said data store;

a data store address register in said third stage, having an input connected to said data store address generator output and to said stack pointer output, and an output connected to the address input of said data store, for accessing a location in said data store;

said instruction sequencing decoder selectively controlling the transfer of the operand of a branch instruction through said multiplexer to said address input of said instruction store in response to the associated branch op code and selectively controlling the loading of the next sequential address in said sequential address register into said stack register in response to said associated branch op code;

an op code decoder in said third stage having an input connected to said instruction store output and a control output connected to said data store, for selectively controlling the nondestructive inputting of the contents of said stack register to the data input of said data store in response to said associated branch op code;

said data store accessing decoder, in response to said branch op code, selectively controlling the incrementing of said stack pointer by unity and the outputting of its contents to said data store address register as the address of the location in said instruction address stack for storing said contents of said stack register as the return address from the branch specified in said branch op code;

whereby said otherwise unused second and third stages are employed during a branching operation to access said instruction stack which is not located on said integrated circuit chip.

2. The apparatus of claim 1, which further comprises:
said instruction sequencing decoder in said first stage, carrying out its said controlling operations during a first phase upon the occurrence of said branch instruction;

said data store accessing decoder in said second stage, carrying out its said controlling operations during a second phase following said first phase;

said data store address register in said third stage accessing said data store at said location in said instruction address stack and said data store storing said contents of said stack register thereat, during a third phase following said second phase.

3. The apparatus of claim 1, which further comprises:
said instruction sequencing decoder in said first stage, during a first phase, selectively controlling the transfer of the contents of said stack register through said multiplexer to said address input of said instruction store as a first next instruction address in response to a first return instruction;

said data store accessing decoder, in said second stage, during a second phase following said first phase and in response to the op code of said return instruction, selectively controlling the decrementing of said stack pointer by unity and the outputting of its contents as a first next data address to said data store address register in said third stage for accessing a second next instruction address stored in said instruction address stack in said data store;

said op code decoder, in said third stage, during a third phase following said second phase, selectively controlling the reading of said second next instruction address accessed from said instruction address stack in said data store for loading into said stack register;

whereby the return address can be used to access said instruction store when a return instruction occurs during said first phase, even though the instruction address stack cannot be accessed in said data store until said third phase.

4. In a stored program data processor formed on an integrated circuit chip, having a pipelined instruction mechanism including a plurality of time-sequential stages with a first stage for instruction sequencing and fetch, a second stage for data store address generation, and a third stage for data store access, said stages operating in an overlapped mode on successive instructions each including an op code and an operand, which are accessed from an instruction store external to said chip, to carry out operations on data accessed from a data store external to said chip, an improved instruction branching mechanism, comprising:

a last-in-first-out instruction address stack in a partitioned area of said data store, for storing addresses for said instruction store;

an instruction address multiplexer in said first stage having an output connected to an address input of said instruction store and having a plurality of inputs, for inputting instruction addresses to said instruction store;

an instruction address incrementer in said first stage having an input connected to said output of said multiplexer and an output connected through a sequential address register to one of said inputs of said multiplexer, for sequentially incrementing said instruction store addresses;

a stack register in said first stage having an input selectively connected to either an output of said sequential address register or to an output from said instruction address stack in said data store, for storing the last instruction store address outputted from said incrementer or storing the last instruction store address outputted from said instruction address stack in said data store and having an output selectively connected to either an input to said multiplexer or to an input to said instruction address stack in said data store;

an instruction sequencing decoder in said first stage having an input connected to an output of said instruction store and an output connected to said multiplexer, for selectively controlling the connection of said instruction store address input, through said multiplexer, to either said sequential address register output or to said stack register output in response to the op code of the last instruction word accessed from said instruction store;

said multiplexer having one of its said plurality of inputs connected to said output of said instruction store for selectively transferring the operand of the last instruction accessed therefrom as a branch address input to said instruction store in response to the decoding of the associated op code in said instruction sequencing decoder;

a data store accessing decoder in said second stage having an input connected to said instruction store output, for decoding the op code from the last instruction accessed from said instruction store;

a data store address generator in said second stage having an input connected to said instruction store output, a control input connected to said data store accessing decoder, and an output, for selectively generating a data store address from the operand of said last accessed instruction word in response to the decoding of the associated op code in said data store accessing decoder;

a stack pointer in said second stage having a control input connected to said data store accessing decoder and an output, for selectively incrementing or decrementing a data store address value for accessing the last instruction address stored in said instruction address stack in said data store;

a data store address register in said third stage, having an input connected to said data store address generator output and to said stack pointer output, and an output connected to the address input of said data store, for accessing a location in said data store;

said instruction sequencing decoder selectively controlling the transfer of the operand of a branch instruction through said multiplexer to said address input of said instruction store in response to the associated branch op code and selectively controlling the loading of the next sequential address in said sequential address register into said stack register in response to said associated branch op code;

an op code decoder in said third stage having an input connected to said instruction store output and a control output connected to said data store, for selectively controlling the nondestructive inputting of the contents of said stack register to the data input of said data store in response to said associated branch op code;

said data store accessing decoder, in response to said branch op code, selectively controlling the incrementing of said stack pointer by unity and the outputting of its contents to said data store address register as the address of the location in said instruction address stack for storing said contents of said stack register as the return address from the branch specified in said branch op code;

whereby said otherwise unused second and third stages are employed during a branching operation to access said instruction stack which is not located on said integrated circuit chip.

5. The apparatus of claim 4, which further comprises:

said instruction sequencing decoder in said first stage, carrying out its said controlling operations during a first phase upon the occurrence of said branch instruction;

said data store accessing decoder in said second stage, carrying out its said controlling operations during a second phase following said first phase;

said data store address register in said third stage accessing said data store at said location in said instruction address stack and said data store storing said contents of said stack register thereat, during a third phase following said second phase.

6. The apparatus of claim 4, which further comprises:

said instruction sequencing decoder in said first stage, during a first phase, selectively controlling the transfer of the contents of said stack register through said multiplexer to said address input of said instruction store as a first next instruction address in response to a first return instruction;

said data store accessing decoder, in said second stage, during a second phase following said first phase and in response to the op code of said return instruction, selectively controlling the decrementing of said stack pointer by unity and the outputting of its contents as a first next data address to said data store address register in said third stage for accessing a second next instruction address stored in said instruction address stack in said data store;

said op code decoder, in said third stage, during a third phase following said second phase, selectively controlling the reading of said second next instruction address accessed from said instruction address stack in said data store for loading into said stack register;

whereby the return address can be used to access said instruction store when a return instruction occurs during said first phase, even though the instruction address stack cannot be accessed in said data store until said third phase.

7. In a stored program data processor, at least a portion of which is formed on an integrated circuit chip, having a pipelined instruction mechanism including a plurality of time-sequential stages with a first stage for instruction sequencing and fetch, a second stage for data store address generation, and a third stage for data store access, said stages operating in an overlapped mode on successive instructions each including an op code and an operand, which are accessed from an instruction store external to said chip, to carry out operations on data accessed from a data store external to said chip, an improved instruction branching mechanism, comprising:

a last-in-first-out instruction address stack in a partitioned area of said data store, for storing addresses for said instruction store;

an instruction address multiplexer in said first stage having an output connected to an address input of said instruction store and having a plurality of inputs, for inputting instruction addresses to said instruction store;

an instruction address incrementer in said first stage having an input connected to said output of said multiplexer and an output connected through a sequential address register to one of said inputs of said multiplexer, for sequentially incrementing said instruction store addresses;

a stack register in said first stage having an input selectively connected to either an output of said sequential address register or to an output from said instruction address stack in said data store, for storing the last instruction store address outputted from said incrementer or storing the last instruction store address outputted from said instruction address stack in said data store and having an output selectively connected to either an input to said multiplexer or to an input to said instruction address stack in said data store;

an instruction sequencing decoder in said first stage having an input connected to an output of said multiplexer, for selectively controlling the connection of said instruction store address input, through said multiplexer, to either said sequential address register output or to one of said plurality of inputs to said multiplexer in response to the op code of the last instruction word accessed from said instruction store;

said multiplexer having one of its said plurality of inputs connected to a branch address register for selectively transferring the contents thereof as a branch address input to said instruction store in response to the decoding of said last instruction op code in said instruction sequencing decoder;

a data store accessing decoder in said second stage having an input connected to said instruction store output, for decoding said op code from said last instruction accessed from said instruction store;

a data store address generator in said second stage having an input connected to said instruction store output, a control input connected to said data store accessing decoder, and an output, for selectively generating a data store address in response to the decoding of said last op code in said data store accessing decoder;
a stack pointer in said second stage having a control input connected to said data store accessing decoder and an output, for selectively incrementing or decrementing a data store address value for accessing the last instruction address stored in said instruction address stack in said data store;
a data store address register in said third stage, having an input connected to said data store address generator output and to said stack pointer output, and an output connected to the address input of said data store, for accessing a location in said data store;
said instruction sequencing decoder selectively controlling the transfer of said contents of said branch address register through said multiplexer to said address input of said instruction store in response to said last branch op code and selectively controlling the loading of the next sequential address in said sequential address register into said stack register in response to said last branch op code;
an op code decoder in said third stage having an input connected to said instruction store output and a control output connected to said data store store, for selectively controlling the nondestructive inputting of the contents of said stack register to the data input of said data store in response to said associated branch op code;
said data store accessing decoder, in response to said last branch op code, selectively controlling the incrementing of said stack pointer by unity and the outputting of its contents to said data store address register as the address of the location in said instruction address stack for storing said contents of said stack register as the return address from the branch specified in said branch op code;
whereby said otherwise unused second and third stages are employed during a branching operation to access said instruction stack which is not located on said integrated circuit chip.

8. The apparatus of claim 7, which further comprises:
said instruction sequencing decoder in said first stage, carrying out its said controlling operations during a first phase upon the occurrence of said branch instruction;
said data store accessing decoder in said second stage, carrying out its said controlling operations during a second phase following said first phase;
said data store address register in said third stage accessing said data store at said location in said instruction address stack and said data store storing said contents of said stack register thereat, during a third phase following said second phase.

9. The apparatus of claim 7, which further comprises:
said instruction sequencing decoder in said first stage, during a first phase, selectively controlling the transfer of the contents of said stack register through said multiplexer to said address input of said instruction store as a first next instruction address in response to a first return instruction;
said data store accessing decoder, in said second stage, during a second phase following said first phase and in response to the op code of said return instruction, selectively controlling the decrementing of said stack pointer by unity and the outputting of its contents as a first next data address to said data store address register in said third stage for accesssing a second next instruction address stored in said instruction address stack in said data store;
said op code decoder, in said third stage, during a third phase following said second phase, selectively controlling the reading of said second next instruction address accessed from said instruction address stack in said data store for loading into said stack register;
whereby the return address can be used to access said instruction store when a return instruction occurs during said first phase, even though the instruction address stack cannot be accessed in said data store until said third phase.

10. In a stored program data processor formed on an integrated circuit chip, having a pipelined instruction mechanism including a plurality of time-sequential stages with a first stage for instruction sequencing and fetch, a second stage for data store address generation, and a third stage for data store access, said stages operating in an overlapped mode on successive instructions each including an op code and an operand, which are accessed from an instruction store external to said chip, to carry out operations on data accessed from a data store external to said chip, an improved method for instruction branching, comprising the steps of:
storing the addresses for said instruction store in a last-in-first-out instruction address stack in a partitioned area of said data store;
inputting instruction addresses to said instruction store into an instruction address multiplexer in said first stage, having an output connected to an address input of said instruction store and having a plurality of inputs;
sequentially incrementing said instruction store addresses by unity in an instruction address incrementer in said first stage, having an input connected to said output of said multiplexer and an output connected through a sequential address register to one of said inputs of said multiplexer;
selectively storing the last instruction store address outputted from said incrementer or alternately storing the last instruction store address outputted from said instruction address stack in said data store in a stack register in said first stage having an input selectively connected to either an output of said sequential address register or to an output from said instruction address stack in said data store, and having an output selectively connected to either an input to said multiplexer or to an input to said instruction address stack in said data store;
selectively controlling the connection of said instruction store address input, through said multiplexer, to either said sequential address register output or to said stack register output in an instruction sequencing decoder in said first stage having an input connected to an output of said instruction store and an output connected to said multiplexer, in response to the op code of the last instruction word accessed from said instruction store;
selectively transferring the operand of the last instruction accessed from said instruction store as a branch address input to said instruction store in response to the decoding of the associated op code in said instruction sequencing decoder;
decoding the op code from the last instruction accessed from said instruction store in a data store accessing decoder in said second stage having an input connected to said instruction store output;

selectively generating a data store address from the operand of said last accessed instruction word in a data store address generator in said second stage having an input connected to said instruction store output, a control input connected to said data store accessing decoder, and an output, in response to the decoding of the associated op code in said data store accessing decoder;

selectively incrementing or decrementing a data store address value for accessing the last instruction address stored in said instruction address stack in said data store in a stack pointer in said second stage having a control input connected to said data store accessing decoder;

accessing a location in said data store in a data store address register in said third stage, having an input connected to said data store address generator output and to said stack pointer output, and an output connected to the address input of said data store;

selectively controlling in said instruction sequencing decoder, the transfer of the operand of a branch instruction through said multiplexer to said address input of said instruction store in response to the associated branch op code and selectively controlling the loading of the next sequential address in said sequential address register into said stack register in response to said associated branch op code;

selectively controlling the nondestructive inputting of the contents of said stack register to the data input of said data store with an op code decoder in said third stage having an input connected to said instruction store output and a control output connected to said data store, in response to said associated branch op code;

selectively controlling in data store accessing decoder, in response to said branch op code, the incrementing of said stack pointer by unity and the outputting of its contents to said data store address register as the address of the location in said instruction address stack for storing said contents of said stack register as the return address from the branch specified in said branch op code;

whereby said otherwise unused second and third stages are employed during a branching operation to access said instruction stack which is not located on said integrated circuit chip.

11. The method of claim 10, which further comprises:

carrying out said controlling operations in said instruction sequencing decoder in said first stage, during a first phase upon the occurrence of said branch instruction;

carrying out said controlling operations in said data store accessing decoder in said second stage, during a second phase following said first phase;

accessing said data store by said data store address register in said third stage, at said location in said instruction address stack and storing in said data store said contents of said stack register, during a third phase following said second phase.

12. The method of claim 10, which further comprises:

selectively controlling with said instruction sequencing decoder in said first stage, during a first phase, the transfer of the contents of said stack register through said multiplexer to said address input of said instruction store as a first next instruction address in response to a first return instruction;

selectively controlling the decrementing of said stack pointer by unity with said data store accessing decoder, in said second stage, during a second phase following said first phase and in response to the op code of said return instruction, and outputting its contents as a first next data address to said data store address register in said third stage for accessing a second next instruction address stored in said instruction address stack in said data store;

selectively controlling the reading of said second next instruction address accessed from said instruction address stack in said data store for loading into said stack register, with said op code decoder, in said third stage, during a third phase following said second phase;

whereby the return address can be used to access said instruction store when a return instruction occurs during said first phase, even though the instruction address stack cannot be accessed in said data store until said third phase.

13. In a stored program data processor having a pipelined instruction mechanism including a plurality of time-sequential stages with a first stage for instruction sequencing and fetch, a second stage for data store address generation, a third stage for data store access, and a fourth stage for arithmetic execution, said stages operating in an overlapped mode on successive instructions each including an op code and an operand, which are accessed from an instruction store to carry out arithmetic operations on data accessed from a data store, an improved instruction branching mechanism, comprising:

a last-in-first-out instruction address stack in a partitioned area of said data store, for storing addresses for said instruction store;

an instruction address multiplexer in said first stage having an output connected to an address input of said instruction store and having a plurality of inputs, for inputting instruction addresses to said instruction store;

an instruction address incrementer in said first stage having an input connected to said output of said multiplexer and an output connected through a sequential address register to one of said inputs of said multiplexer, for sequentially incrementing said instruction store addresses by unity;

a stack register in said first stage having an input selectively connected to either an output of said sequential address register or to an output from said instruction address stack in said data store, for storing the last instruction store address outputted from said incrementer or storing the last instruction store address outputted from said instruction address stack in said data store and having an output selectively connected to either an input to said multiplexer or to an input to said instruction address stack in said data store;

an instruction sequencing decoder in said first stage having an input connected to an output of said instruction store and an output connected to said multiplexer, for selectively controlling the connection of said instruction store address input, through said multiplexer, to either said sequential address register output or to said stack register output in response to the op code of the last instruction word accessed from said instruction store;

said multiplexer having one of its said plurality of inputs connected to said output of said instruction store for selectively transferring the operand of the last instruction accessed therefrom as a branch address input to said instruction store in response to the decoding of the associated op code in said instruction sequencing decoder;

a data store accessing decoder in said second stage having an input connected to said instruction store output, for decoding the op code from the last instruction accessed from said instruction store;

a data store address generator in said second stage having an input connected to said instruction store output, a control input connected to said data store accessing decoder, and an output, for selectively generating a data store address from the operand of said last accessed instruction word in response to the decoding of the associated op code in said data store accessing decoder;

a stack pointer in said second stage having a control input connected to said data store accessing decoder and an output, for selectively incrementing or decrementing a data store address value for accessing the last instruction address stored in said instruction address stack in said data store;

a data store address register in said third stage, having an input connected to said data store address generator output and to said stack pointer output, and an output connected to the address input of said data store, for accessing a location in said data store;

said instruction sequencing decoder selectively controlling the transfer of the operand of a branch instruction through said multiplexer to said address input of said instruction store in response to the associated branch op code and selectively controlling the loading of the next sequential address in said sequential address register into said stack register in response to said associated branch op code;

an op code decoder in said third stage having an input connected to said instruction store output and a control output connected to said data store, for selectively controlling the nondestructive inputting of the contents of said stack register to the data input of said data store in response to said associated branch op code;

said data store accessing decoder, in response to said branch op code, selectively controlling the incrementing of said stack pointer by unity and the outputting of its contents to said data store address register as the address of the location in said instruction address stack for storing said contents of said stack register as the return address from the branch specified in said branch op code;

whereby said otherwise unused second and third stages are employed during a branching operation to access said instruction stack.

14. The apparatus of claim 13, which further comprises:

said instruction sequencing decoder in said first stage, carrying out its said controlling operations during a first phase upon the occurrence of said branch instruction;

said data store accessing decoder in said second stage, carrying out its said controlling operations during a second phase following said first phase;

said data store address register in said third stage accessing said data store at said location in said instruction address stack and said data store storing said contents of said stack register thereat, during a third phase following said second phase.

15. The apparatus of claim 13, which further comprises:

said instruction sequencing decoder in said first stage, during a first phase, selectively controlling the transfer of the contents of said stack register through said multiplexer to said address input of said instruction store as a first next instruction address in response to a first return instruction;

said data store accessing decoder, in said second stage, during a second phase following said first phase and in response to the op code of said return instruction, selectively controlling the decrementing of said stack pointer by unity and the outputting of its contents as a first next data address to said data store address register in said third stage for accessing a second next instruction address stored in said instruction address stack in said data store;

said op code decoder, in said third stage, during a third phase following said second phase, selectively controlling the reading of said second next instruction address accessed from said instruction address stack in said data store for loading into said stack register;

whereby the return address can be used to access said instruction store when a return instruction occurs during said first phase, even though the instruction address stack cannot be accessed in said data store until said third phase.

16. In a stored program data processor having a pipelined instruction mechanism including a plurality of time-sequential stages with a first stage for instruction sequencing and fetch, a second stage for data store address generation, and a third stage for data store access, said stages operating in an overlapped mode on successive instructions each including an op code and an operand, which are accessed from an instruction store to carry out operations on data accessed from a data store, an improved instruction branching mechanism, comprising:

a last-in-first-out instruction address stack in a partitioned area of said data store, for storing addresses for said instruction store;

an instruction address multiplexer in said first stage having an output connected to an address input of said instruction store and having a plurality of inputs, for inputting instruction addresses to said instruction store;

an instructon address incrementer in said first stage having an input connected to said output of said multiplexer and an output connected through a sequential address register to one of said inputs of said multiplexer, for sequentially incrementing said instruction store addresses;

a stack register in said first stage having an input selectively connected to either an output of said sequential address register or to an output from said instruction address stack in said data store, for storing the last instruction store address outputted from said incrementer or storing the last instruction store address outputted from said instruction address stack in said data store and having an output selectively connected to either an input to said multiplexer or to an input to said instruction address stack in said data store;

an instruction sequencing decoder in said first stage having an input connected to an output of said instruction store and an output connected to said multiplexer, for selectively controlling the connection of said instruction store address input, through said multiplexer, to either said sequential address register output or to said stack register output in response to the op code of the last instruction word accessed from said instruction store;

said multiplexer having one of its said plurality of inputs connected to said output of said instruction store for selectively transferring the operand of the last instruction accessed therefrom as a branch address input to said instruction store in response to the decoding of the associated op code in said instruction sequencing decoder;

a data store accessing decoder in said second stage having an input connected to said instruction store output, for decoding the op code from the last instruction accessed from said instruction store;

a data store address generator in said second stage having an input connected to said instruction store output, a control input connected to said data store accessing decoder, and an output, for selectively generating a data store address from the operand of said last accessed instruction word in response to the decoding of the associated op code in said data store accessing decoder;

a stack pointer in said second stage having a control input connected to said data stored accessing decoder and an output, for selectively incrementing or decrementing a data store address value for accessing the last instruction address stored in said instruction address stack in said data store;

a data store address register in said third stage, having an input connected to said data store address generator output and to said stack pointer output, and an output connected to the address input of said data store, for accessing a location in said data store;

said instruction sequencing decoder selectively controlling the transfer of the operand of a branch instruction through said multiplexer to said address input of said instruction store in response to the associated branch op code and selectively controlling the loading of the next sequential address in said sequential address register into said stack register in response to said associated branch op code;

an op code decoder in said third stage having an input connected to said instruction store output and a control output connected to said data store, for selectively controlling the nondestructive inputting of the contents of said stack register to the data input of said data store in response to said associated branch op code;

said data store accessing decoder, in response to said branch op code, selectively controlling the incrementing of said stack pointer by unity and the outputting of its contents to said data store address register as the address of the location in said instruction address stack for storing said contents of said stack register as the return address from the branch specified in said branch op code;

whereby said otherwise unused second and third stages are employed during a branching operation to access said instruction stack.

17. The apparatus of claim 16, which further comprises:

said instruction sequencing decoder in said first stage, carrying out its said controlling operations during a first phase upon the occurrence of said branch instruction;

said data store accessing decoder in said second stage, carrying out its said controlling operations during a second phase following said first phase;

said data store address register in said third stage accessing said data store at said location in said instruction address stack and said data store storing said contents of said stack register thereat, during a third phase following said second phase.

18. The apparatus of claim 16, which further comprises:

said instruction sequencing decoder in said first stage, during a first phase, selectively controlling the transfer of the contents of said stack register through said multiplexer to said address input of said instruction store as a first next instruction address in response to a first return instruction;

said data store accessing decoder, in said second stage, during a second phase following said first phase and in response to the op code of said return instruction, selectively controlling the decrementing of said stack pointer by unity and the outputting of its contents as a first next data address to said data store address register in said third stage for accessing a second next instruction address stored in said instruction address stack in said data store;

said op code decoder, in said third stage, during a third phase following said second phase, selectively controlling the reading of said second next instruction address accessed from said instruction address stack in said data store for loading into said stack register;

whereby the return address can be used to access said instruction store when a return instruction occurs during said first phase, even though the instruction address stack cannot be accessed in said data store until said third phase.

19. In a stored program data processor having a pipelined instruction mechanism including a plurality of time-sequential stages with a first stage for instruction sequencing and fetch, a second stage for data store address generation, and a third stage for data store access, said stages operating in an overlapped mode on successive instructions each including an op code and an operand, which are accessed from an instruction store to carry out operations on data accessed from a data store, an improved instruction branching mechanism, comprising:

a last-in-first-out instruction address stack in a partitioned area of said data store, for storing addresses for said instruction store;

an instruction address multiplexer in said first stage having an output connected to an address input of said instruction store and having a plurality of inputs, for inputting instruction addresses to said instruction store;

an instruction address incrementer in said first stage having an input connected to said output of said multiplexer and an output connected through a sequential address register to one of said inputs of said multiplexer, for sequentially incrementing said instruction store addresses;

a stack register in said first stage having an input selectively connected to either an output of said sequential address register or to an output from said instruction address stack in said data store, for storing the last instruction store address outputted from said incrementer or storing the last instruction store address outputted from said instruction address stack in said data store and having an output selectively connected to either an input to said multiplexer or to an input to said instruction address stack in said data store;

an instruction sequencing decoder in said first stage having an input connected to an output of said multiplexer, for selectively controlling the connection of said instruction store address input, through said multiplexer, to either said sequential address register output or to one of said plurality of inputs to said multiplexer in response to the op code of the last instruction word accessed from said instruction store;

said multiplexer having one of its said plurality of inputs connected to a branch address register for selectively transferring the contents thereof as a branch address input to said instruction store in response to the decoding of said last instruction op code in said instruction sequencing decoder;

a data store accessing decoder in said second stage having an input connected to said instruction store output, for decoding said op code from said last instruction accessed from said instruction store;

a data store address generator in said second stage having an input connected to said instruction store output, a control input connected to said data store accessing decoder, and an output, for selectively generating a data store address in response to the decoding of said last op code in said data store accessing decoder;

a stack pointer in said second stage having a control input connected to said data store accessing decoder and an output, for selectively incrementing or decrementing a data store address value for accessing the last instruction address stored in said instruction address stack in said data store;

a data store address register in said third stage, having an input connected to said data store address generator output and to said stack pointer output, and an output connected to the address input of said data store, for accessing a location in said data store;

said instruction sequencing decoder selectively controlling the transfer of said contents of said branch address register through said multiplexer to said address input of said instruction store in response to said last branch op code and selectively controlling the loading of the next sequential address in said sequential address register into said stack register in response to said last branch op code;

an op code decoder in said third stage having an input connected to said instruction store output and a control output connected to said data store, for selectively controlling the nondestructive inputting of the contents of said stack register to the data input of said data store in response to said associated branch op code;

said data store accessing decoder, in response to said last branch op code, selectively controlling the incrementing of said stack pointer by unity and the outputting of its contents to said data store address register as the address of the location in said instruction address stack for storing said contents of said stack register as the return address from the branch specified in said branch op code;

whereby said otherwise unused second and third stages are employed during a branching operation to access said instruction stack.

20. The apparatus of claim 19, which further comprises:
said instruction sequencing decoder in said first stage, carrying out its said controlling operations during a first phase upon the occurrence of said branch instruction;
said data store accessing decoder in said second stage, carrying out its said controlling operations during a second phase following said first phase;
said data store address register in said third stage accessing said data store at said location in said instruction address stack and said data store storing said contents of said stack register thereat, during a third phase following said second phase.

21. The apparatus of claim 19, which further comprises:
said instruction sequencing decoder in said first stage, during a first phase, selectively controlling the transfer of the contents of said stack register through said multiplexer to said address input of said instruction store as a first next instruction address in response to a first return instruction;
said data store accessing decoder, in said second stage, during a second phase following said first phase and in response to the op code of said return instruction, selectively controlling the decrementing of said stack pointer by unity and the outputting of its contents as a first next data address to said data store address register in said third stage for accessing a second next instruction address stored in said instruction address stack in said data store;
said op code decoder, in said third stage, during a third phase following said second phase, selectively controlling the reading of said second next instruction address accessed from said instruction address stack in said data store for loading into said stack register;
whereby the return address can be used to access said instruction store when a return instruction occurs during said first phase, even though the instruction address stack cannot be accessed in said data store until said third phase.

22. In a stored program data processor having a pipelined instruction mechanism including a plurality of time-sequential stages with a first stage for instruction sequencing and fetch, a second stage for data store address generation, and a third stage for data store access, said stages operating in an overlapped mode on successive instructions each including an op code and an operand, which are accessed from an instruction store to carry out operations on data accessed from a data store an improved method for instruction branching, comprising the steps of:
storing the addresses for said instruction store in a last-in-first-out instruction address stack in a partitioned area of said data store;
inputting instruction addresses to said instruction store into an instruction address multiplexer in said first stage, having an output connected to an address input of said instruction store and having a plurality of inputs;
sequentially incrementing said instruction store addresses by unity in an instruction address incrementer in said first stage, having an input connected to said output of said multiplexer and an output connected through a sequential address register to one of said inputs of said multiplexer;

selectively storing the last instruction store address outputted from said incrementer or alternately storing the last instruction store address outputted from said instruction address stack in said data store in a stack register in said first stage having an input selectively connected to either an output of said sequential address register or to an output from said instruction address stack in said data store, and having an output selectively connected to either an input to said multiplexer or to an input to said instruction address stack in said data store;

selectively controlling the connection of said instruction store address input, through said multiplexer, to either said sequential address register output or to said stack register output in an instruction sequencing decoder in said first stage having an input connected to an output of said instruction store and an output connected to said multiplexer, in response to the op code of the last instruction word accessed from said instruction store;

selectively transferring the operand of the last instruction accessed from said instruction store as a branch address input to said instruction store in response to the decoding of the associated op code in said instruction sequencing decoder;

decoding the op code from the last instruction accessed from said instruction store in a data store accessing decoder in said second stage having an input connected to said instruction store output;

selectively generating a data store address from the operand of said last accessed instruction word in a data store address generator in said second stage having an input connected to said instruction store output, a control input connected to said data store accessing decoder, and an output, in response to the decoding of the associated op code in said data store accessing decoder;

selectively incrementing or decrementing a data store address value for accessing the last instruction address stored in said instruction address stack in said data store in a stack pointer in said second stage having a control input connected to said data store accessing decoder;

accessing a location in said data store in a data store address register in said third stage, having an input connected to said data store address generator output and to said stack pointer output, and an output connected to the address input of said data store;

selectively controlling in said instruction sequencing decoder, the transfer of the operand of a branch instruction through said multiplexer to said address input of said instruction store in response to the associated branch op code and selectively controlling the loading of the next sequential address in said sequential address register into said stack register in response to said associated branch op code;

selectively controlling the nondestructive inputting of the contents of said stack register to the data input of said data store with an op code decoder in said third stage having an input connected to said instruction store output and a control output connected to said data store, in response to said associated branch op code;

selectively controlling in data store accessing decoder, in response to said branch op code, the incrementing of said stack pointer by unity and the outputting of its contents to said data store address register as the address of the location in said instruction address stack for storing said contents of said stack register as the return address from the branch specified in said branch op code; whereby said otherwise unused second and third stages are employed during a branching operation to access said instruction stack.

23. The method of claim 22, which further comprises:
carrying out said controlling operations in said instruction sequencing decoder in said first stage, during a first phase upon the occurrence of said branch instruction;
carrying out said controlling operations in said data store accessing decoder in said second stage, during a second phase following said first phase;
accessing said data store by said data store address register in said third stage, at said location in said instruction address stack and storing in said data store said contents of said stack register, during a third phase following said second phase.

24. The method of claim 22, which further comprises:
selectively controlling with said instruction sequencing decoder in said first stage, during a first phase, the transfer of the contents of said stack register through said multiplexer to said address input of said instruction store as a first next instruction address in response to a first return instruction;
selectively controlling the decrementing of said stack pointer by unity with said data store accessing decoder, in said second stage, during a second phase following said first phase and in response to the op code of said return instruction, and outputting its contents as a first next data address to said data store address register in said third stage for accessing a second next instruction address stored in said instruction address stack in said data store;
selectively controlling the reading of said second next instruction address accessed from said instruction address stack in said data store for loading into said stack register, with said op code decoder, in said third stage, during a third phase following said second phase;
whereby the return address can be used to access said instruction store when a return instruction occurs during said first phase, even though the instruction address stack cannot be accessed in said data store until said third phase.

25. The invention of claim 1, 4, 7, 10, 13, 16, 19, or 22, which further comprises:
said instruction sequencing decoder in said first stage decoding a previous instruction during a first cycle, and controlling said multiplexer to input a first address to said istruction store, fetching a first instruction from said instruction store;
said instruction sequencing decoder in said first stage decoding said first instruction as a first return instruction during a second cycle following said first cycle, and controlling said multiplexer to transfer the contents $S_i$ of said stack register as a second address to said instruction store, fetching a second instruction from said instruction store;
said data store accessing decoder in said second stage decoding said first instruction as said first return instruction during said second cycle and controlling said stack pointer to decrement its contents by unity to a value i-1 which is output to said data store address register in said third stage as a first data store address for said instruction address stack;

said instruction sequencing decoder in said first stage decoding said second instruction as a second return instruction during a third cycle following said second cycle, and controlling said multiplexer to again transfer the contents $S_i$ which still occupies said stack register, as said second address to said instruction store, again fetching said second instruction from said instruction store;

said instruction sequencing decoder in said first stage having an No-Op output connected to said data store accessing decoder in said second stage and to said op code decoder in said third stage, for outputting a No-Op signal upon the detection of said second return instruction during said third cycle;

said data store accessing decoder in said second stage decoding said second instruction as said second return instruction during said third cycle and controlling said stack pointer to decrement its contents by unity to a value i-2 which is output to said data store address register in said third stage as a second data store address for said instruction address stack;

said op code decoder in said third stage decoding said first instruction as said first return instruction during said third cycle and controlling said data store to access a first datum from said instruction address stack at said first data store address i-1 and output it as the value $S_{i-1}$ to said stack register in said first stage;

said instruction sequencing decoder in said first stage again decoding said second instruction as the second occurrence of said second return instruction during a fourth cycle following said third cycle, and controlling said multiplexer to transfer the contents $S_{i-1}$ of said stack register as a third address to said instruction store, fetching a third instruction from said instruction store;

said data accessing decoder in said second stage omitting operations on said stack pointer during said fourth cycle, in response to said No-Op signal;

said op code decoder in said third stage decoding said second instruction as said second return instruction during said fourth cycle and controlling said data store to access a second datum from said instruction address stack at said second data store address i-2 and output it as the value $S_{i-2}$ to said stack register in said first stage;

said instruction sequencing decoder in said first stage decoding said third instruction as a first next instruction during a fifth cycle following said fourth cycle, and controlling said multiplexer to input a first next instruction address to said instruction store, fetching a fourth instruction from said instruction store;

said data store accessing decoder in said second stage decoding said third instruction as said first next instruction during said fifth cycle, and controlling said data store address generator to output a first next data store address to said data store address register in said third stage;

said op code decoder in said third stage omitting operations on said data store during said fifth cycle, in response to said No-Op signal;

whereby the instruction store accessing operations for two consecutive return instructions are expanded in time.

26. The invention of claim 25, which further comprises:

said instruction sequencing decoder in said first stage decoding said fourth instruction as a second next instruction during a sixth cycle following said fifth cycle, and controlling said multiplexer to input a second next instruction address to said instruction store, fetching a fifth instruction from said instruction store;

said data store accessing decoder in said second stage decoding said fourth instruction as said second next instruction during said sixth cycle, and controlling said data store address generator to output a second next data store address to said data store address register in said third stage;

said op code decoder in said third stage decoding said third instruction as said first next instruction during said sixth cycle and controlling said data store to access a third datum at said first next data store address.

* * * * *